July 7, 1959

G. E. HENNING 2,893,056

APPARATUS FOR EXTRUDING PLASTIC MATERIAL

Filed May 8, 1956

INVENTOR.
G. E. HENNING
BY
ATTORNEY

July 7, 1959

G. E. HENNING 2,893,056

APPARATUS FOR EXTRUDING PLASTIC MATERIAL

Filed May 8, 1956

INVENTOR.
G. E. HENNING
BY
ATTORNEY

United States Patent Office 2,893,056
Patented July 7, 1959

---

2,893,056

APPARATUS FOR EXTRUDING PLASTIC MATERIAL

George E. Henning, Baltimore, Md., assignor to Western Electric Company, Incorporated, New York, N.Y., a corporation of New York Application May 8, 1956, Serial No. 583,468

1 Claim. (Cl. 18—13)

This invention relates to apparatus for extruding plastic material, and more particularly to apparatus for extruding organic plastic insulating and jacketing material upon continuously advancing filamentary conductors or other cores.

In producing an extruded covering on a filamentary conductor, or the like, serious difficulties often have been encountered heretofore in maintaining the covering concentric with respect to the conductor. One of the principal causes of eccentricity is the presence of unbalanced flow conditions in the extrusion head employed to form the covering on the conductor. This problem of unbalanced flow conditions is inherent in a conventional extruder of the cross head type.

The extrusion head of a conventional extruder of the cross head type is provided generally with an extrusion passage that communicates with and extends transversely across the exit end of the extrusion cylinder in which a stock screw is positioned for forcing an extrudable plastic material into the extrusion passage. A core guide is located at one end of the transversely extending extrusion passage and the conductor to be insulated is advanced through a guide passage in the core guide and into the extrusion passage at a point closely adjacent to a forming die positioned in the exit end of the extrusion passage. The core guide centers the conductor so that it tends to pass through the axial center of the forming die.

The plastic material envelops the conductor in the space between the wall of the extrusion die orifice and the exit end of the core guide and is formed into a tubular covering surrounding the continuously advancing conductor. To produce a concentric covering on the conductor, it is essential that the quantity of flow of the plastic material be balanced throughout the entire cross section of the extrusion passage in the vicinity in which the material envelops the conductor. The problem of maintaining such a balanced flow condition is complicated by the fact that in the cross head type extruder there is an abrupt change in the direction of flow of the plastic material between the stock screw and the die orifice.

Due to the unavoidable 90° bend, the length of the path traversed by the plastic material flowing through that portion of the cross section of the extrusion passage nearest to the stock screw is substantially shorter than that traversed by the material flowing through the portion diametrically opposite. In addition, in some extruders of this type, the flow of the plastic material through the portion of the cross section of the extrusion passage nearest to the stock screw approximates that of a fluid flow bounded by a single plate whereas in the diametrically opposite portion of the cross section the flow approximates that of a fluid flow bounded by two parallel plates. Hence, the friction losses in the portion of a cross section of the extrusion passage nearest to the stock screw are appreciably lower than those elsewhere in the cross section.

As a result of the differences in the lengths of the paths traversed by the plastic material in various portions of the extrusion passage and the physical environment of their associated flows, there exist substantial differences in the consistency and rate of flow throughout a cross section of the flow of plastic material entering the die orifice, the portion of the cross section nearest to the stock screw having the highest rate of flow and the more remote portion which is diametrically opposite thereto having the lowest rate of flow. The resultant unbalance of flows through the cross section of the extrusion passage at the entrance to the die orifice gives rise to eccentricity in the covering extruded upon the conductor, the thinnest portion of the eccentric covering occurring in that portion of the insulation produced in the region where the lowest rate of flow exists.

Various apparatus have been devised heretofore in an attempt to obtain balanced flow conditions in extruders to insure concentricity of the extruded covering on a finished insulated conductor. Heretofore the solutions to this problem have not been entirely satisfactory or require relatively expensive changes in the design of conventional extruding apparatus.

It is an object of this invention to provide new and improved apparatus for extruding plastic material.

Another object of this invention is to provide new and improved apparatus for extruding organic plastic insulating and jacketing material upon continuously advancing filamentary conductors or other cores.

Apparatus illustrating certain features of the invention may include an improvement in extrusion apparatus comprising an extrusion cylinder having an extrusion bore formed therein, an extrusion head mounted at the discharge end of the extrusion cylinder and provided with a passageway communicating with the extrusion bore and extending transversely with respect thereto, means for forcing a plastic material along the extrusion bore and into the passageway, and an extrusion die mounted at one end of the passageway. The improvement may comprise means for directing the plastic material emerging from the extrusion bore initially toward the end of the passageway remote from the extrusion die and for directing the plastic material subsequently from the remote end of the passageway to the extrusion die.

A complete understanding of the invention may be obtained from the following detailed description of apparatus forming specific embodiments thereof, when read in conjunction with the appended drawings in which.

Figure 1:
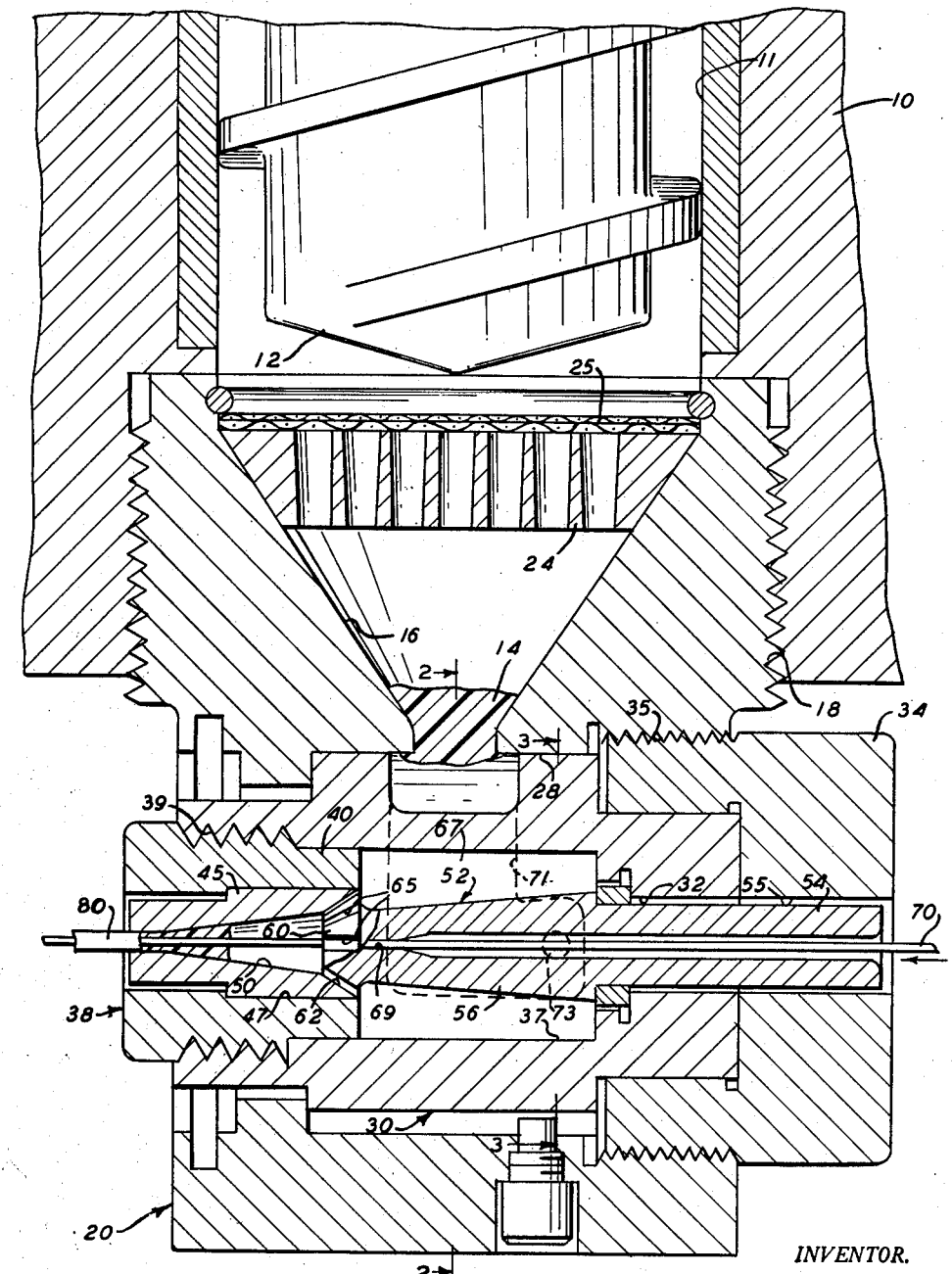
Fig. 1 is a fragmentary, horizontal section of extruding apparatus illustrating certain features of the invention.

Referring now in detail to the drawings, there is shown in Fig. 1 an extrusion cylinder 10 having formed therein an elongated, cylindrical extrusion bore 11 in which a stock screw 12 is mounted rotatably. The stock screw 12 is designed to be rotated by suitable drive means (not shown) for the purpose of working and forcing a plastic insulating material 14 along the extrusion bore 11 and into and through a tapered opening 16 in a body member 18 forming part of an extrusion head, designated generally by the numeral 20.

The extrusion head 20 is mounted detachably to the discharge end of the extrusion cylinder 10 so that the tapered opening 16 forms a continuation of the extrusion bore 11. Positioned transversely across the tapered opening 16 in the extrusion head 20 in a perforated, frustoconical backing plate 24 upon which is supported a screen pack 25. The tapered opening 16 communicates with a cylindrical bore 28 formed in the body member 18 transversely with respect to the longitudinal axis of the extrusion bore 11.

A generally cylindrical tool holder, designated generally by the numeral 30, having a cylindrical bore 32 formed coaxially therein is mounted removably within the body member 18 and is held in place by means of a threaded retainer nut 34. The retainer nut 34 is engaged threadedly within a complementary, threaded counterbore 35 formed in the body member 18. The tool holder 30 is provided additionally with a coaxial counterbore 37.

An annular die holder, designated generally by the numeral 38, is mounted threadedly within a threaded portion 39 at the lefthand end, as viewed in Fig. 1, of the counterbore 37. A reduced cylindrical end portion 40 of the die holder 38 fits closely within and extends partly into the counterbore 37. An extrusion die 45 is positioned coaxially within a complementary die-receiving seat 47 provided in the die holder 38. The die 45 is oriented so that the longitudinal axis of an extrusion orifice 50 formed therein is aligned accurately on the common longitudinal axis of the counterbore 37 and the bore 32 formed in the tool holder 30.

A hollow core guide, designated generally by the numeral 52, is mounted within the counterbore 37 and has a reduced, cylindrical shank portion 54 extending through the bore 32 and through a central aperture 55 provided in the retainer nut 34. The core guide 52 is positioned concentrically with respect to the counterbore 37 and has a frustoconical neck 56, which tapers slightly from a maximum diameter at the righthand end of the counterbore 37 to a minimum diameter adjacent to the extrusion die 45. Formed integrally with the lefthand end of the neck 56 is an enlarged, generally frustoconical, pluglike head 60 which fits closely within a complementary, frustoconical mouth 62 of the extrusion orifice 50. The head 60 is tapered at an included angle of approximately 60° and has a maximum diameter at the righthand end thereof and a minimum diameter at the lefthand end thereof.

The frustoconical periphery of the head 60 is relieved by a plurality of substantially identical radial grooves 65—65 spaced equally therearound. The grooves 65—65 connect the die orifice 50 with a relatively large, annular, pressure-equalizing chamber 67 formed by the space between the neck 56 of the core guide 52 and the cylindrical wall of the counterbore 37. The pressure-equalizing chamber is bounded at one end by the head 60 and at the other end by the base at the righthand end of the counterbore 37.

From the mouth 62 the throat die orifice tapers frustoconically at an included angle of approximately 20° with respect to the longitudinal axis thereto from a maximum diameter at the righthand end thereof to a minimum diameter at the lefthand end thereof. The core guide 52 is provided with a longitudinally extending passage 69 aligned accurately with the longitudinal axis of the die orifice 50 to guide a conductor 70 advancing through the passage longitudinally through the center of the die orifice.

Figure 2:
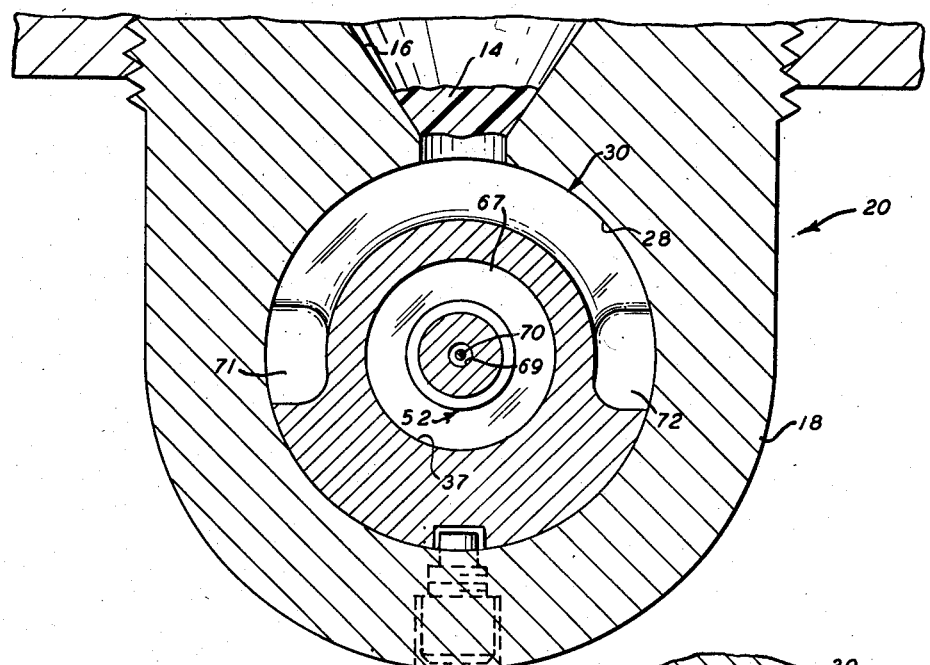
Fig. 2 is a fragmentary, vertical section taken along line 2—2 of Fig. 1.
Figure 3:
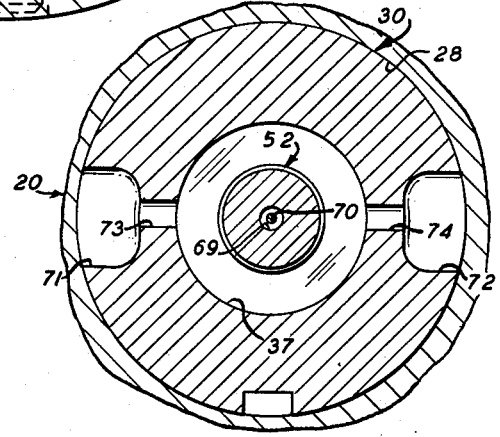
Fig. 3 is a fragmentary, vertical section taken along line 3—3 of Fig. 1.
Figure 4:
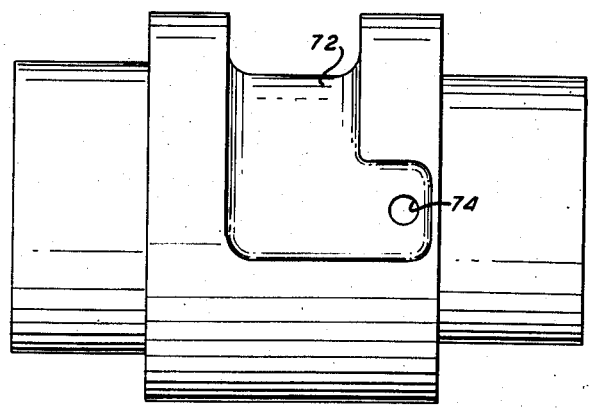
Fig. 4 is a side view of a tool holder forming a part of the apparatus shown in Fig. 1.

The tool holder 30 is provided with two identical, interconnected, generally L-shaped channels 71 and 72 (Figs. 2, 3 and 4) formed in the cylindrical surface thereof. The channels 71 and 72 extend arcuately in opposite directions from the exit end of the tapered opening 16 in the body member 18 to diametrically opposite positions at the center of the tool holder 30. At this point they turn through 90° angles and extend longitudinally along the tool holder toward the righthand end of the counterbore 37, as viewed in Fig. 1.

The channels 71 and 72 communicate with relatively small, radially extending feed ports 73 and 74, respectively, formed in the wall of the tool holder. The ports 73 and 74 communicate, in turn, with the pressure-equalizing chamber 67 near the extreme righthand end thereof, as viewed in Fig. 1. The feed ports 73 and 74 are identical in size and shape and preferably are circular in cross section. The feed ports 73 and 74 are positioned diametrically opposite to each other and symmetrically with respect to a horizontal plane containing the longitudinal axis of the tool holder 30, whereby they are equidistantly spaced from the exit end of the tapered opening 16 in the body member 18.

*Operation*

During the operation of the extruding apparatus the filamentary conductor 70 is advanced longitudinally at a predetermined speed in the direction of the arrow shown in Fig. 1. At the same time a suitable plastic material 14, such as polyethylene or the like, is advanced by the rotating stock screw 12 through the extrusion bore 11 and into the tapered opening 16 in the extrusion head 20.

Upon leaving the tapered opening 16, the plastic material 14 is split into two streams and flows through the channels 71 and 72. The two separate streams of plastic material 14 initially flow circumferentially in opposite directions and then rearwardly along the channels 71 and 72 in the tool holder 30 to the feed ports 73 and 74, respectively. The two separate streams then flow through the ports 73 and 74, and enter the pressure-equalizing chamber 67 near the extreme righthand end thereof.

Since the channels 71 and 72 are identical and feed ports 73 and 74 are spaced equidistantly from the exit end of the tapered opening 16, the paths traversed by the two separate streams of plastic material 14 are identical in all respects. Accordingly, the quantities of plastic material entering the pressure-equalizing chamber 67 through the two, identical feed ports 73 and 74 are equal.

Due to the fact that the pressure-equalizing chamber 67 has a relatively large volumetric capacity, disturbances created by the plastic material 14 entering the chamber through the feed ports 73 and 74 are effectively damped out. The feed ports 73 and 74 are located near the extreme righthand end of the pressure-equalizing chamber 67 and, hence, such disturbances are confined to the portion of the chamber which is relatively remote from the die orifice 50.

In addition, as a result of the relatively large cross sectional area of the pressure-equalizing chamber 67, the velocity of the flow of plastic material 14 within the chamber 67 is relatively low compared to the flow of plastic material through the throat of the die orifice 50 at its minimum diameter. This relationship acts to maintain what is virtually a constant static pressure at the entrance to the die orifice 50 and the plastic material flowing into the die orifice through the radial grooves 65—65 is substantially uniform in consistency and rate of flow throughout. Thus, the quantity of plastic material flowing throughout a cross section of the die orifice 50 is completely balanced and results in the application of a concentric, tubular covering 80 on the conductor 70, which covering is uniform in wall thickness throughout.

In the selection of the size and location of the feed ports 73 and 74 care must be taken to insure that the feed ports are located sufficiently far enough away from the mouth 62 of the die orifice 50 to insure the damping out of any disturbances resulting from the flow of plastic material 14 as it passes through the feed ports 73 and 74 from the channels 71 and 72, respectively, into the pressure-equalizing chamber 67. In addition, to minimize the pressure drop through the feed ports 73 and 74, the combined cross sectional area of the feed ports should be preferably slightly larger than the free area surrounding the conductor 70 at the minimum diameter of the throat of the die orifice 50. On the other hand, the cross sectional area of each of the feed ports 73 and 74 must be held relatively small in order to minimize any tendency for the plastic material to flow along the path of the least resistance, which is adjacent to the sides of the feed ports nearest to the stock screw 12.

In a specific apparatus embodying the principles of the invention substantially balanced flow conditions were obtained by properly dimensioning the chamber 67, the channels 71 and 72 and the feed ports 73 and 74, to achieve the following relationships between the average velocities of the flow of the plastic material 14 at various points:

$$V_2 = .036 V_1$$
$$V_3 = .88 V_1$$
$$V_4 = .05 V_1$$

where:

$V_1$=Average velocity of the plastic material flowing through the free area of the die orific 50;

$V_2$=Average velocity of the plastic material flowing through the pressure-equalizing chamber 67;

$V_3$=Average velocity of the plastic material flowing through the feed ports 73 and 74, and $V_4$=Average velocity of the plastic material flowing through the channels 71 and 72.

It will be understood that the term "plastic material" as employed in the specification and appended claims is meant to include thermoplastic materials, such as polyethylene, polyvinyl chloride compounds, and the like, and also thermosetting materials, such as rubber compounds, neoprene compounds, and the like.

It is manifest that the above-described embodiment of the invention is merely illustrative of an application of the principles of the invention and that numerous other arrangements may be readily devised by those skilled in the art incorporating the broad principles of the invention.

What is claimed is:

In an apparatus for extruding plastic material including an extrusion cylinder and an extrusion head having a coaxial passageway therein mounted transversely with respect to the extrusion cylinder, the improvement which comprises a substantially cylindrical tool holder mounted closely, and detachably in the passageway in the head and having a coaxial bore and a coaxial counterbore, a portion of the counterbore forms a relatively large, hollow pressure-equalizing chamber extending coaxially with respect to the head and transversely on opposite sides of the cylinder, a channel formed by a peripheral groove extending substantially one hundred and eighty degrees circumferentially of the tool holder and positioned so that the peripheral groove is symmetrical with respect to the axis of the cylinder, a pair of channels formed by a pair of parallel, longitudinally extending peripheral grooves extending rearwardly from the ends of the first-mentioned channel in diametrically opposite portions of the tool holders, a pair of relatively small, radial feed ports positioned at diametrically opposite portions of the tool holder adjacent to the end of the chamber and connecting the chamber with the rearwardly extending channels, a die holder mounted in the forward end of the counterbore adjacent to the hollow chamber, a die provided with a frustoconical bore and positioned in the die holder, a core guide having a grooved, frustoconical, plug-like head fitting within a complementary portion of the bore in the die, means for advancing successive portions of a core of indefinite length continuously through the core guide and die, and means for forcing plastic material through the cylinder and head and out the free area between the core and die, the sizes of each of the channels forming the pair of channels, each of the feed ports and the pressure-equalizing chamber being such that the average velocity of the plastic material flowing therethrough will be respectively approximately 0.05, 0.88, and 0.036 times the average velocity of the plastic material flowing through the minimum free area between the core and die orifice.

References Cited in the file of this patent

UNITED STATES PATENTS

| 2,766,480 | Henning | Oct. 16, 1956 |
| 2,766,481 | Henning | Oct. 16, 1956 |

FOREIGN PATENTS

| 624,699 | Great Britain | June 15, 1949 |
| 649,873 | Great Britain | Feb. 7, 1951 |